United States Patent
Niu et al.

(10) Patent No.: US 10,631,256 B2
(45) Date of Patent: Apr. 21, 2020

(54) POWER HEADROOM OF GRANTLESS UPLINK

(71) Applicant: Apple Inc., Cupertino, CA (US)

(72) Inventors: Huaning Niu, San Jose, CA (US); Wenting Chang, Beijing (CN); Jeongho Jeon, San Jose, CA (US); Anthony Lee, San Diego, CA (US); Seau S. Lim, Swindon (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/139,443

(22) Filed: Sep. 24, 2018

(65) Prior Publication Data

US 2019/0045459 A1   Feb. 7, 2019

Related U.S. Application Data

(60) Provisional application No. 62/562,796, filed on Sep. 25, 2017, provisional application No. 62/564,978, filed on Sep. 28, 2017.

(51) Int. Cl.
| | |
|---|---|
| *H04W 52/36* | (2009.01) |
| *H04W 52/32* | (2009.01) |
| *H04W 52/14* | (2009.01) |
| *H04W 24/10* | (2009.01) |
| *H04W 76/27* | (2018.01) |
| *H04W 72/12* | (2009.01) |
| *H04W 80/02* | (2009.01) |

(52) U.S. Cl.
CPC ......... *H04W 52/365* (2013.01); *H04W 24/10* (2013.01); *H04W 52/146* (2013.01); *H04W 52/325* (2013.01); *H04W 72/1268* (2013.01); *H04W 76/27* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2011/0171988 A1* | 7/2011 | Kim | H04W 52/346 455/522 |
| 2017/0064534 A1* | 3/2017 | Loehr | H04W 72/04 |
| 2018/0376434 A1* | 12/2018 | Cui | H04W 72/1289 |

OTHER PUBLICATIONS

3GPP, "Technical Specification Group Radio Access Network; Evolved Universal Terrestrial Radio Access Medium Access Control (MAC) protocol specification (Release 14)," 3GPP TS 36.321 V14.3.0 (Jun. 2017), LTE Advanced Pro, 107 pages.

* cited by examiner

*Primary Examiner* — Mohammed Rachedine
(74) *Attorney, Agent, or Firm* — Sterne, Kessler, Goldstein & Fox P.L.L.C.

(57) ABSTRACT

Embodiments herein are related to grantless uplink control information (G-UCI) content and size designs/mechanisms in MulteFire (MF) systems. Since the power control of the grantless uplink (GUL) use is different from the scheduled uplink (SUL), the power headroom (PHR) calculation and reporting should be enhanced. Embodiments herein provide an electronic apparatus employed in an user equipment (UE). The electronic apparatus comprises a radio frequency (RF) circuitry interface and processing circuitry. In an example, the processing circuitry is configured to calculate the PHR of the GUL physical uplink shared channel (PUSCH); generate an uplink data including the PHR of GUL.

19 Claims, 7 Drawing Sheets

POWER HEADROOM OF GRANTLESS UPLINK

REFERENCE TO RELATED APPLICATIONS

This application claims the benefit of U.S. Provisional Application No. 62/562,796 filed Sep. 25, 2017, entitled "POWER HEADROOM OF GRANTLESS UPLINK", and U.S. Provisional Application No. 62/564,978 filed Sep. 28, 2017, entitled "POWER HEADROOM OF GRANTLESS UPLINK", the contents of which are herein incorporated by reference in their entirety.

FIELD

The present disclosure relates to the field of wireless communications, especially relates to power headroom of grantless uplink.

BACKGROUND

Owing to the popularity of mobile and smart devices, the recent widespread adoption of wireless broadband has resulted in a tremendous growth in the volume of mobile data traffic, and has radical changed the system requirements. For instance, while it has become very critical to lower the complexity, elongate the battery life, and support the highly mobility and service continuity of the devices, higher data rate and bandwidth, and lower latency are also more than ever necessary to support modern applications.

In order to meet the needs of future wireless networks in the past years several physical layer techniques have been introduced (e.g., multiple input multiple output (MIMO) techniques, enhanced inter-cell interference coordination (eICIC) and coordinated multi-point designs, etc.), and more recently an increasing interest has risen in operating cellular networks in unlicensed spectrum to cope the scarcity of licensed spectrum in low frequency band with the aim to further improve the rate. In this context, one of the major enhancement for Long Term Evolution (LTE) in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Enhanced operation of LTE systems in unlicensed spectrum is also expected in future releases, and to be further carrier in fifth generation (5G) systems. Potential LTE operation in unlicensed spectrum includes but not limited to 1) the LTE operation in the unlicensed spectrum via dual connectivity (DC)—called DC based LAA herein, and 2) the standalone LTE system in the unlicensed spectrum, where LTE-based technology solely operates in unlicensed spectrum without requiring an "anchor" in licensed spectrum—called MulteFire. MulteFire, combining the performance benefits of LTE technology with the simplicity of Wi-Fi-like deployments, is envisioned as a significantly important technology component to meet the ever-increasing wireless traffic.

MulteFire supports the autonomous uplink transmission without grant from anchored eNB—called grantless uplink (GUL). Also, the same work item is also agreed and started in the 3GPP. According to the current agreement that, Power control: The SUL reuse the legacy procedure without impact. The GUL power is determined by:

$$P_{PUSCH,c,GUL}(i) = \min\left\{\begin{array}{l} P_{CMAX,c}(i), \\ 10\log_{10}(M_{PUSCH,c,GUL}(i)) + P_{O\_PUSCH,c}(j) + \\ \alpha_c(j) \cdot PL_c + \Delta_{TF,c}(i) + f_{c,GUL}(i) \end{array}\right\}$$

where $M_{PUSCH,c,GUL}$ is the bandwidth of the grant less PUSCH resource

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of examples and not by way of limitation in the figures of the accompanying drawings.

DETAILED DESCRIPTION

Figure 1:
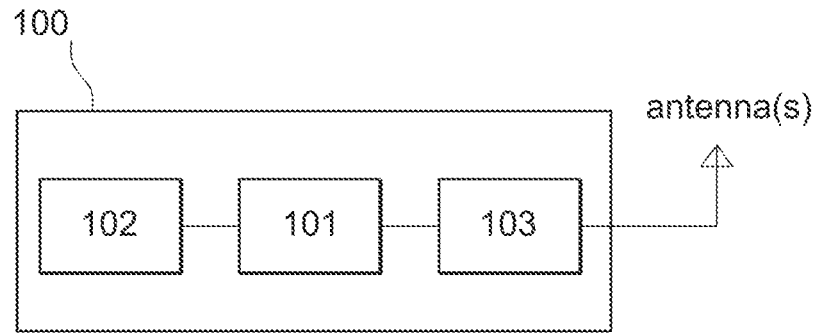
FIG. 1 illustrates an exemplary electronic apparatus or system in accordance with some embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). Embodiments herein are related to grantless uplink control information (G-UCI) content and size designs/mechanisms in MulteFire (MF) systems.

Since the power control of the GUL use is different from the SUL, the power headroom (PHR) calculation and reporting may need to be enhanced. Embodiments herein provide the PHR procedure of GUL. Embodiments herein provide power headroom of GUL including (1) PHR calculation; (2) PHR trigger; and (3) PHR reporting.

In legacy LTE system, there are three types of PHR calculation, these are: (1) Type 1 PHR is reported, mainly focus on the regular power headroom calculation, including PUSCH without/with PUCCH, and without PUSCH. (2) Type 2 PHR is reported, mainly focus on the Pcell, or cells configured with simultaneousPUCCH-PUSCH. (3) Type 3 PHR is reported with SRS bias.

In an embodiment, the PHR of GUL can be either reported or not reported. If it's reported, it can be transmitted through either SUL or GUL PUSCH subframe.

In an embodiment, the PHR of SUL can be transmitted only on SUL PUSCH subframe, or transmitted on both SUL and GUL PUSCH subframes.

According to the current agreement, that the dynamic power configuration, and multiple carrier aggregation of grantless Physical Uplink Shared Channel (PUSCH) transmission is different from the scheduled PUSCH transmission.

In an embodiment, the PHR of GUL PUSCH is calculated as:

$$PH_{type1,c}(i) = P_{CMAX,c}(i) - \{10 \log_{10}(M_{PUSCH\_GUL,c}(i)) + P_{O\_PUSCH,c}(j) + \alpha_c(j) \cdot PL_c + \Delta_{TE,c}(i) + f_{GUL,c}(i)\}$$

Where $M_{PUSCH\_GUL,c}$ is the configured GUL resource. It's configured by eNB through activation/release DCI; $P_{O\_PUSCH,c}$ reuses the SUL; $f_{GUL,c}$ is the dynamic power adjustment, which are configured by eNB through GUL activation/release DCI, or grantless DCI.

In an embodiment, since there is no PUCCH and SRS transmitted together with grantless PUSCH. The type 3 PHR is not supported for GUL. For type 1 and 2 PHR, the PHR of PUSCH transmission without PUCCH is supported for GUL PUSCH.

In the legacy LTE system, a Power Headroom Report (PHR) shall be triggered if any of the following events occur: (1) prohibitPHR-Timer expires or has expired and the path loss has changed more than dl-PathlossChange dB for at least one activated Serving Cell of any Media Access Control (MAC) entity which is used as a pathloss reference since the last transmission of a PHR in this MAC entity when the MAC entity has uplink (UL) resources for new transmission; (2) periodicPHR-Timer expires; (3) upon configuration or reconfiguration of the power headroom reporting functionality by upper layers [8], which is not used to disable the function; (4) activation of an secondary cell (SCell) of any MAC entity with configured uplink; (5) addition of the primary secondary cell (PSCell); (6) prohibitPHR-Timer expires or has expired, when the MAC entity has UL resources for new transmission, and the following is true in this TTI for any of the activated Serving Cells of any MAC entity with configured uplink; (7) there are UL resources allocated for transmission or there is a physical uplink control channel (PUCCH) transmission on this cell, and the required power backoff due to power management (as allowed by P-MPRc [10]) for this cell has changed more than dl-PathlossChange dB since the last transmission of a PHR when the MAC entity had UL resources allocated for transmission or PUCCH transmission on this cell.

In an embodiment, the PHR of GUL reuse the trigger condition as the legacy PHR of SUL. The GUL can reuse the same value of "prohibitPHR-Timer" and "periodicPHR-Timer", but utilize a separate account, since the PHR reporting time of SUL and GUL may be different.

In an embodiment, if the PHR of SUL can be transmitted in the GUL PUSCH, a new MAC Control Element (CE) index can be introduced for GUL PHR reporting.

In other embodiments, the SUL is only allowed to be transmitted in the SUL, then GUL PHR can reuse the MAC CE index of SUL PHR. The eNB can distinguish them by detecting whether this subframe is SUL or GUL.

In an embodiment, only one or multiple MAC CE (e.g., GUL PHR) can be transmitted on GUL. Alternatively, one or multiple MAC CE is allowed to be transmitted when there are multiplexing data.

For instance, only one or multiple MAC CEs can be transmitted with single interlace configuration.

For another instance, only there is multiplexing data, MAC CE is allowed to be transmitted on GUL when GUL is configured with full bandwidth configuration.

FIG. 1 illustrates an exemplary electronic apparatus or system 100 configured to be employed in a UE (e.g., the UE 401 or 402 discussed in accordance with FIG. 4, which will be discussed later). In an embodiment, the electronic apparatus 100 comprises one or more processors 101 (e.g., the one or more processors discussed in accordance with FIG. 6 and/or FIG. 7, which will be discussed later) configured to cause the UE to calculate a power headroom (PHR) of a grantless uplink (GUL) physical uplink shared channel (PUSCH); trigger the PHR of GUL PUSCH; and report the PHR of GUL PUSCH. In an embodiment, the one or more processors 101 may include processing circuitry and an associated memory interface. In an embodiment, the electronic apparatus 100 may further include a memory 102 coupled with the memory interface and communication circuitry 103 containing a transceiver or a transmitter and/or a receiver coupled to antenna(s). In an embodiment, the electronic apparatus 100 may further include an RF circuitry interface to couple the processing circuitry to RF circuitry.

Figure 2:
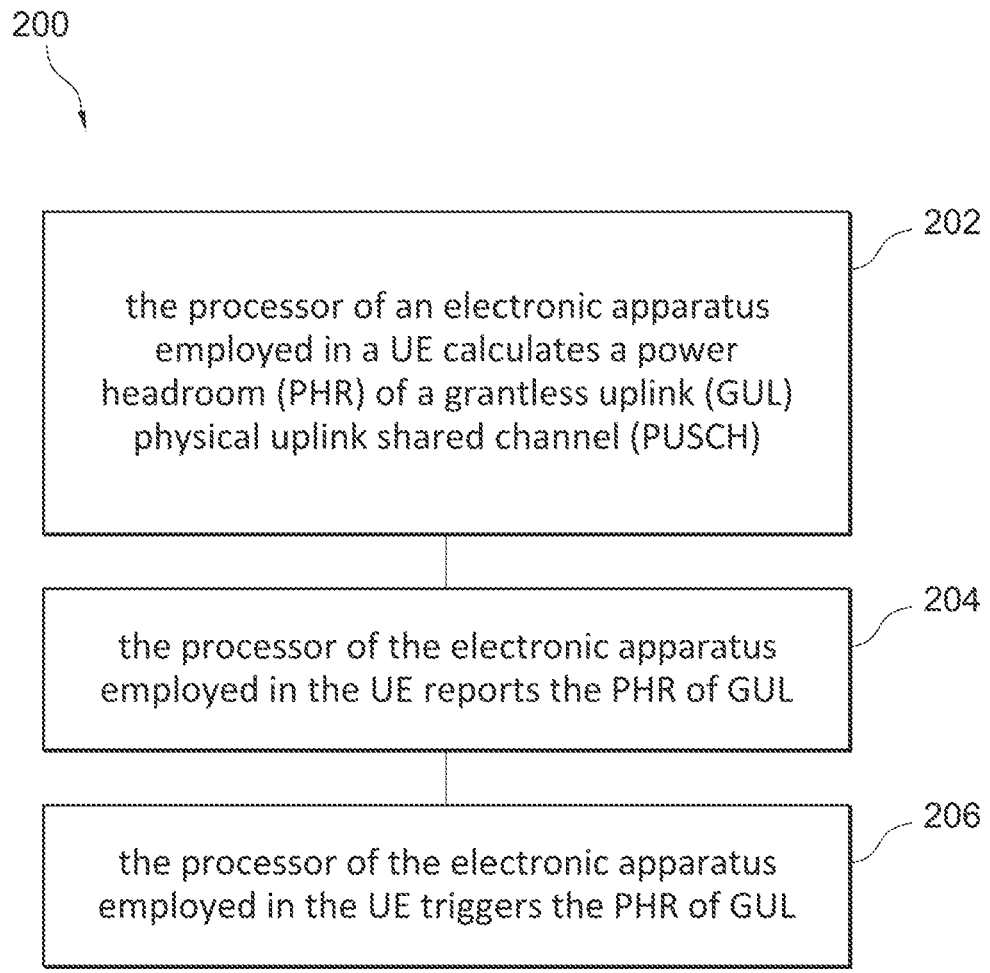
FIG. 2 is a flow chart illustrating an exemplary procedure in accordance with some embodiments of the present disclosure.

FIG. 2 is a flow chart illustrating an exemplary procedure 200 that facilitates the power headroom (PHR) according to some embodiments. At the operation 202, the processor of an electronic apparatus employed in a UE calculates a power headroom (PHR) of a grantless uplink (GUL) physical uplink shared channel (PUSCH). In an embodiment, the PHR of GUL is calculated according to the formula $PH_{type1,c}(i) = P_{CMAX,c}(i) - \{10 \log_{10}(M_{PUSCH\_GUL,c}(i)) + P_{O\_PUSCH,c}(j) + \alpha_c(j) \cdot PL_c + \Delta_{TE,c}(i) + f_{GUL,c}(i)\}$, wherein $M_{PUSCH\_GUL,c}$ is a configured GUL resource; $P_{O\_PUSCH,c}$ reuses a scheduled uplink (SUL); $f_{GUL,c}$ is a dynamic power adjustment. In an embodiment, the processor is further configured to calculate a PHR of SUL and report the PHR of SUL. In an embodiment, the PHR of GUL is a type 1 PHR or a type 2 PHR. In an embodiment, the PHR of SUL is a type 1 PHR, a type 2 PHR or a type 3 PHR.

At the operation 204, the processor of the electronic apparatus employed in the UE reports the PHR of GUL. In an embodiment, the PHR of GUL transmits on either the SUL or the GUL PUSCH subframe when the PHR of GUL is reported. In an embodiment, the PHR of SUL transmits only on SUL PUSCH subframe or transmitted on both the SUL and the GUL PUSCH subframe when the PHR of SUL is reported. In an embodiment, the processor is configured to report the PHR of GUL and the PHR of SUL to an eNB. In an embodiment, a Medium Access Control (MAC) Control Element (CE) index is introduced for the PHR of GUL reporting when he PHR of SUL is transmitted in the SUL.

At the operation 206, the processor of the electronic apparatus employed in the UE triggers the PHR of GUL. In an embodiment, the processor is further configured to trigger the PHR of GUL and the PHR of SUL. In an embodiment, the electronic apparatus further comprises a prohibitPHR-Timer and a periodicPHR-Timer. In an embodiment, the processor is further configured to trigger the PHR of GUL when the prohibitPHR-Timer expires or has expired. In an embodiment, the processor is further configured to trigger the PHR of GUL when the periodicPHR-Timer expires.

Figure 3:
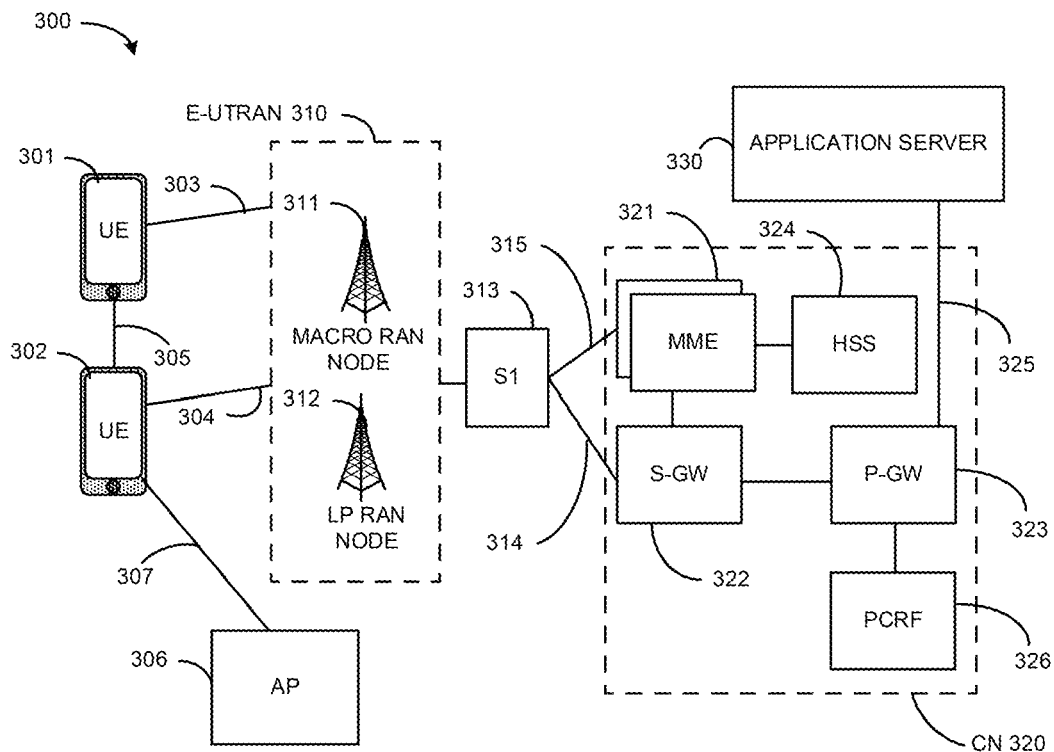
FIG. 3 illustrates an architecture of a system of a network in accordance with some embodiments of the present disclosure.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310—the RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 is shown to be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 310 is shown to be communicatively coupled to a core network (CN) 320—via an S1 interface 313. In an embodiment, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and the serving gateway (S-GW) 322, and the S1-mobility management entity (MME) interface 315, which is a signaling interface between the RAN nodes 311 and 312 and MMEs 321.

In this embodiment, the CN 320 comprises the MMEs 321, the S-GW 322, the Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the EPC network 323 and external networks such as a network including the application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
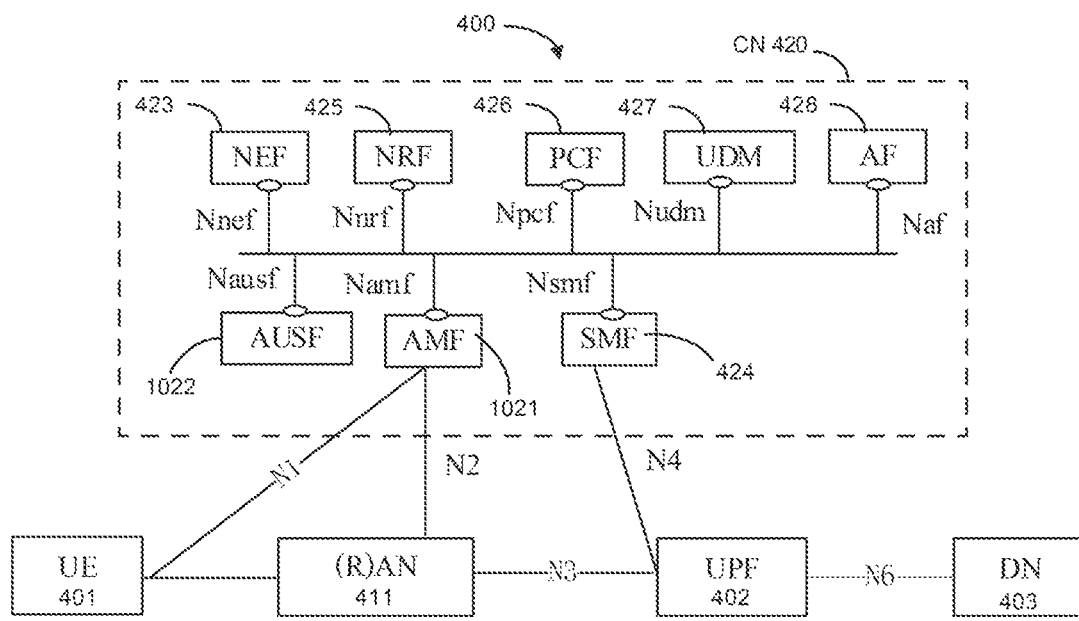
FIG. 4 illustrates an architecture of a system of a network in accordance with some embodiments of the present disclosure

FIG. 4 illustrates an architecture of a system 400 of a network in accordance with some embodiments. The system 400 is shown to include a UE 401, which may be the same or similar to UEs 301 and 302 discussed previously; a RAN node 411, which may be the same or similar to RAN nodes 311 and 312 discussed previously; a User Plane Function (UPF) 402; a Data network (DN) 403, which may be, for example, operator services, Internet access or 3rd party services; and a 5G Core Network (5GC or CN) 420.

The CN 420 may include an Authentication Server Function (AUSF) 422; a Core Access and Mobility Management Function (AMF) 421; a Session Management Function (SMF) 424; a Network Exposure Function (NEF) 423; a Policy Control function (PCF) 426; a Network Function (NF) Repository Function (NRF) 425; a Unified Data Management (UDM) 427; and an Application Function (AF) 428. The CN 420 may also include other elements that are not shown, such as a Structured Data Storage network function (SD SF), an Unstructured Data Storage network function (UDSF), and the like.

The UPF 402 may act as an anchor point for intra-RAT and inter-RAT mobility, an external PDU session point of interconnect to DN 403, and a branching point to support multi-homed PDU session. The UPF 402 may also perform packet routing and forwarding, packet inspection, enforce user plane part of policy rules, lawfully intercept packets (UP collection); traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 402 may include an uplink classifier to support routing traffic flows to a data network. The DN 403 may represent various network operator services, Internet access, or third party services. NY 403 may include, or be similar to application server 330 discussed previously.

The AUSF 422 may store data for authentication of UE 401 and handle authentication related functionality. Facilitates a common authentication framework for various access types.

The AMF 421 may be responsible for registration management (e.g., for registering UE 401, etc.), connection management, reachability management, mobility management, and lawful interception of AMF-related events, and access authentication and authorization. AMF 421 may provide transport for SM messages between and SMF 424, and act as a transparent proxy for routing SM messages. AMF 421 may also provide transport for short message service (SMS) messages between UE 401 and an SMS function (SMSF) (not shown by FIG. 4). AMF 421 may act as Security Anchor Function (SEA), which may include interaction with the AUSF 422 and the UE 401, receipt of an intermediate key that was established as a result of the UE 401 authentication process. Where USIM based authentication is used, the AMF 421 may retrieve the security material from the AUSF 422. AMF 421 may also include a Security Context Management (SCM) function, which receives a key from the SEA that it uses to derive access-network specific keys. Furthermore, AMF 421 may be a termination point of RAN CP interface (N2 reference point), a termination point of NAS (N1) signalling, and perform NAS ciphering and integrity protection.

AMF 421 may also support NAS signalling with a UE 401 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE 401 and AMF 421, and relay uplink and downlink user-plane packets between the UE 401 and UPF 402. The N3IWF also provides mechanisms for IPsec tunnel establishment with the UE 401.

The SMF 424 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 424 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN.

The NEF 423 may provide means for securely exposing the services and capabilities provided by 3GPP network functions for third party, internal exposure/re-exposure, Application Functions (e.g., AF 428), edge computing or fog computing systems, etc. In such embodiments, the NEF 423 may authenticate, authorize, and/or throttle the AFs. NEF 423 may also translate information exchanged with the AF 428 and information exchanged with internal network functions. For example, the NEF 423 may translate between an AF-Service-Identifier and an internal 5GC information. NEF 423 may also receive information from other network functions (NFs) based on exposed capabilities of other network functions. This information may be stored at the NEF 423 as structured data, or at a data storage NF using a standardized interfaces. The stored information can then be re-exposed by the NEF 423 to other NFs and AFs, and/or used for other purposes such as analytics.

The NRF 425 may support service discovery functions, receive NF Discovery Requests from NF instances, and provide the information of the discovered NF instances to the NF instances. NRF 425 also maintains information of available NF instances and their supported services.

The PCF 426 may provide policy rules to control plane function(s) to enforce them, and may also support unified policy framework to govern network behaviour. The PCF 426 may also implement a front end (FE) to access subscription information relevant for policy decisions in a UDR of UDM 427.

The UDM 427 may handle subscription-related information to support the network entities' handling of communication sessions, and may store subscription data of UE 401. The UDM 427 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 426. UDM 427 may also support SMS management, wherein an SMS-FE implements the similar application logic as discussed previously.

The AF 428 may provide application influence on traffic routing, access to the Network Capability Exposure (NCE), and interact with the policy framework for policy control. The NCE may be a mechanism that allows the 5GC and AF 428 to provide information to each other via NEF 423, which may be used for edge computing implementations. In such implementations, the network operator and third party services may be hosted close to the UE 401 access point of attachment to achieve an efficient service delivery through the reduced end-to-end latency and load on the transport network. For edge computing implementations, the 5GC may select a UPF 402 close to the UE 401 and execute traffic steering from the UPF 402 to DN 403 via the N6 interface. This may be based on the UE subscription data, UE location, and information provided by the AF 428. In this way, the AF 428 may influence UPF (re)selection and traffic routing. Based on operator deployment, when AF 428 is considered to be a trusted entity, the network operator may permit AF 428 to interact directly with relevant NFs.

As discussed previously, the CN 420 may include an SMSF, which may be responsible for SMS subscription checking and verification, and relaying SM messages to/from the UE 401 to/from other entities, such as an SMS-GMSC/IWMSC/SMS-router. The SMS may also interact with AMF 421 and UDM 427 for notification procedure that the UE 401 is available for SMS transfer (e.g., set a UE not reachable flag, and notifying UDM 427 when UE 401 is available for SMS).

The system 400 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 400 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 420 may include an Nx interface, which is an inter-CN interface between the MME (e.g., MME 321) and the AMF 421 in order to enable interworking between CN 420 and CN 320.

Although not shown by FIG. 4, system 400 may include multiple RAN nodes 411 wherein an Xn interface is defined between two or more RAN nodes 411 (e.g., gNBs and the like) that connecting to 5GC 420, between a RAN node 411 (e.g., gNB) connecting to 5GC 420 and an eNB (e.g., a RAN node 311 of FIG. 3), and/or between two eNBs connecting to 5GC 420.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 401 in a connected mode (e.g., CM-CONNECTED) including functionality to manage the UE mobility for connected mode between one or more RAN nodes 411. The mobility support may include context transfer from an old (source) serving RAN node 411 to new (target) serving RAN node 411; and control of user plane tunnels between old (source) serving RAN node 411 to new (target) serving RAN node 411.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 5:
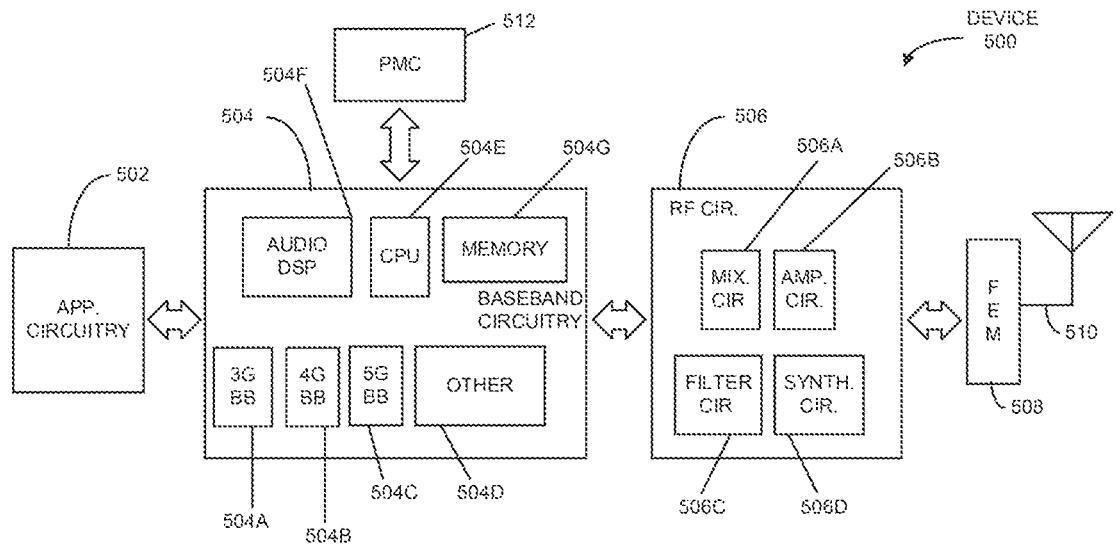
FIG. 5 illustrates exemplary components of a device in accordance with some embodiments of the present disclosure.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include less elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuity 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), si5h generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

While FIG. 5 shows the PMC 512 coupled only with the baseband circuitry 504. However, in other embodiments, the PMC 512 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example e, processors of the baseband circuitry 504, alone or in combination, may be used execute Layer 3, Layer 2, or Layer 1 functionality, while processors of the application circuitry 504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
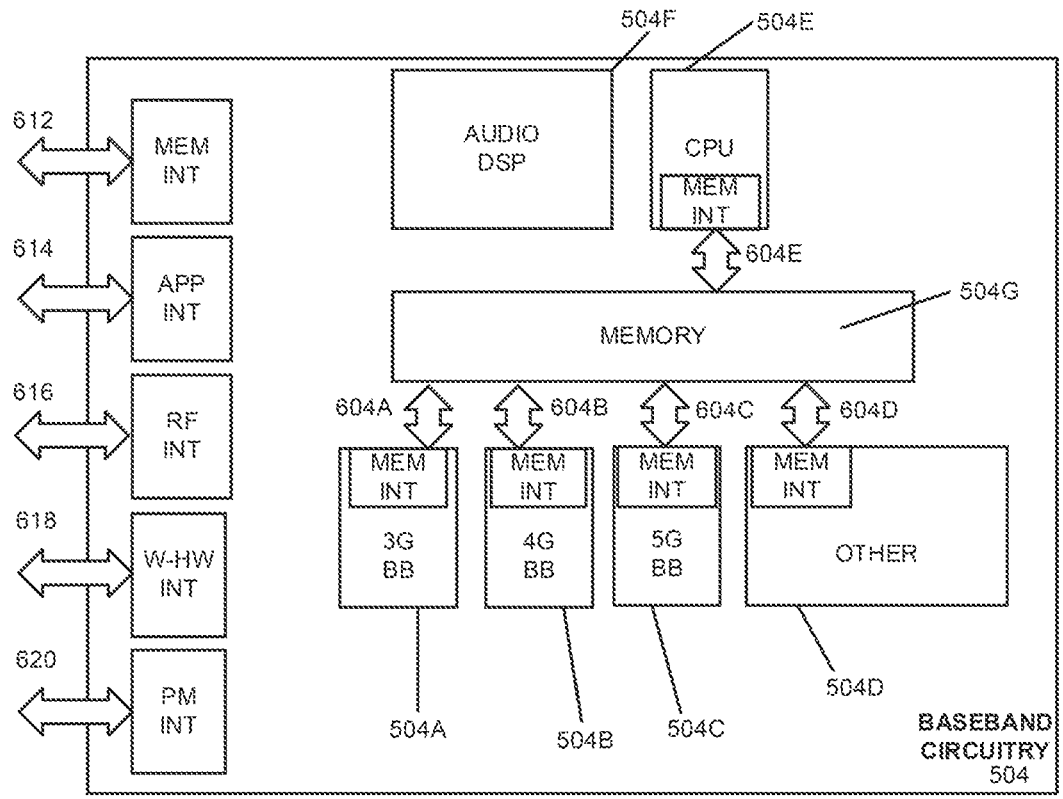
FIG. 6 illustrates exemplary interfaces of baseband circuitry in accordance with some embodiments of the present disclosure.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

Figure 7:
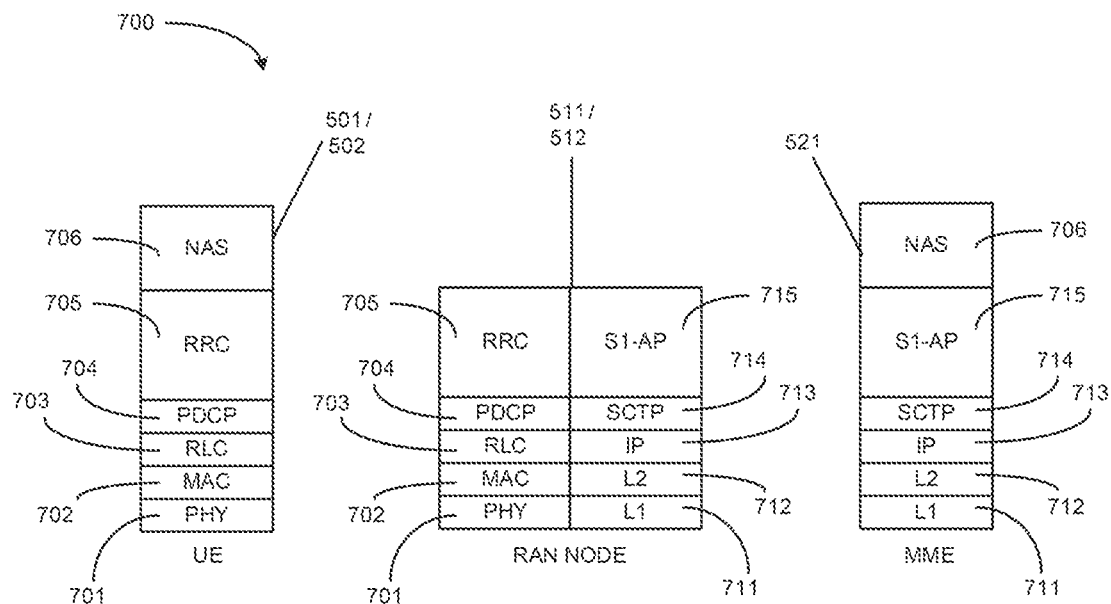
FIG. 7 is an illustration of a control plane protocol stack in accordance with some embodiments of the present disclosure.

FIG. 7 is an illustration of a control plane protocol stack in accordance with some embodiments. In this embodiment, a control plane 700 is shown as a communications protocol stack between the UE 301 (or alternatively, the UE 302), the RAN node 311 (or alternatively, the RAN node 312), and the MME 321.

The PHY layer 701 may transmit or receive information used by the MAC layer 702 over one or more air interfaces. The PHY layer 701 may further perform link adaptation or adaptive modulation and coding (AMC), power control, cell search (e.g., for initial synchronization and handover purposes), and other measurements used by higher layers, such as the RRC layer 705. The PHY layer 701 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 702 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 703 may operate in a plurality of modes of operation, including: Transparent Mode (TM), Unacknowledged Mode (UM), and Acknowledged Mode (AM). The RLC layer 703 may execute transfer of upper layer protocol data units (PDUs), error correction through automatic repeat request (ARQ) for AM data transfers, and concatenation, segmentation and reassembly of RLC SDUs for UM and AM data transfers. The RLC layer 703 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 704 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 705 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 301 and the RAN node 311 may utilize a Uu interface (e.g., an LTE-Uu interface) to exchange control plane data via a protocol stack comprising the PHY layer 701, the MAC layer 702, the RLC layer 703, the PDCP layer 704, and the RRC layer 705.

The non-access stratum (NAS) protocols 706 form the highest stratum of the control plane between the UE 301 and the MME 321. The NAS protocols 706 support the mobility of the UE 301 and the session management procedures to establish and maintain IP connectivity between the UE 301 and the P-GW 323.

The S1 Application Protocol (S1-AP) layer 715 may support the functions of the S1 interface and comprise Elementary Procedures (EPs). An EP is a unit of interaction between the RAN node 311 and the CN 320. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 714 may ensure reliable delivery of signaling messages between the RAN node 311 and the MME 321 based, in part, on the IP protocol, supported by the IP layer 713. The L2 layer 712 and the L1 layer 711 may refer to communication links (e.g., wired or wireless) used by the RAN node and the MME to exchange information.

The RAN node 311 and the MME 321 may utilize an S1-MME interface to exchange control plane data via a protocol stack comprising the L1 layer 711, the L2 layer 712, the IP layer 713, the SCTP layer 714, and the S1-AP layer 715.

Figure 8:
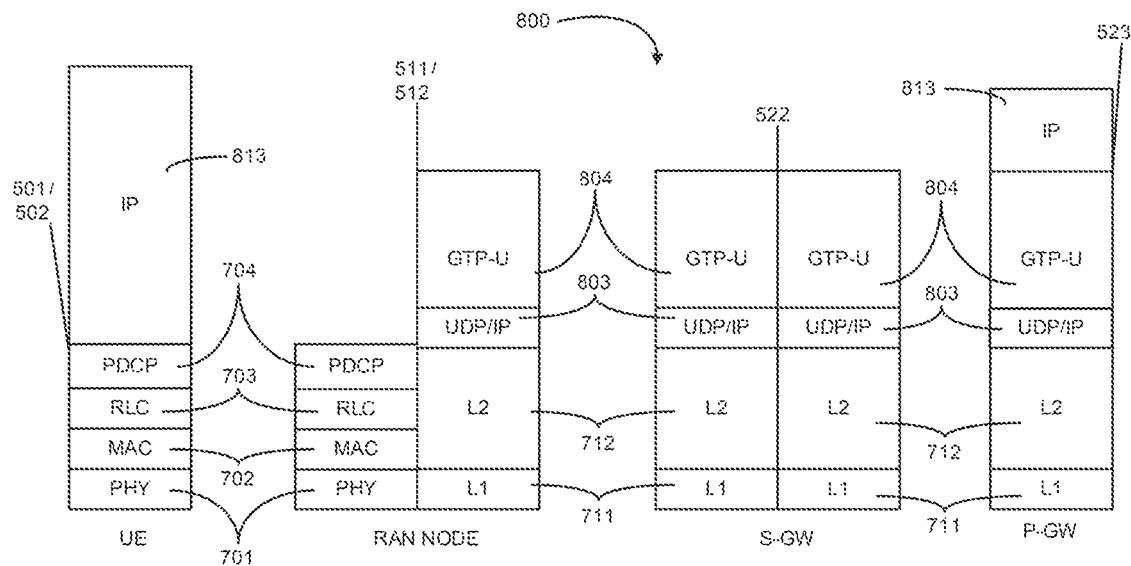
FIG. 8 is an illustration of a user plane protocol stack in accordance with some embodiments of the present disclosure.

FIG. 8 is an illustration of a user plane protocol stack in accordance with some embodiments. In this embodiment, a user plane 800 is shown as a communications protocol stack between the UE 301 (or alternatively, the UE 302), the RAN node 311 (or alternatively, the RAN node 312), the S-GW 322, and the P-GW 323. The user plane 800 may utilize at least some of the same protocol layers as the control plane 700. For example, the UE 301 and the RAN node 311 may utilize a Uu interface (e.g., an LTE-Uu interface) to exchange user plane data via a protocol stack comprising the PHY layer 701, the MAC layer 702, the RLC layer 703, the PDCP layer 704.

The General Packet Radio Service (GPRS) Tunneling Protocol for the user plane (GTP-U) layer 804 may be used for carrying user data within the GPRS core network and between the radio access network and the core network. The user data transported can be packets in any of IPv4, IPv6, or PPP formats, for example. The UDP and IP security (UDP/IP) layer 803 may provide checksums for data integrity, port numbers for addressing different functions at the source and destination, and encryption and authentication on the selected data flows. The RAN node 311 and the S-GW 322 may utilize an S1-U interface to exchange user plane data via a protocol stack comprising the L1 layer 711, the L2 layer 712, the UDP/IP layer 803, and the GTP-U layer 804. The S-GW 322 and the P-GW 323 may utilize an S5/S8a interface to exchange user plane data via a protocol stack comprising the L1 layer 711, the L2 layer 712, the UDP/IP layer 803, and the GTP-U layer 804. As discussed above with respect to FIG. 7, NAS protocols support the mobility of the UE 301 and the session management procedures to establish and maintain IP connectivity between the UE 301 and the P-GW 323.

Figure 9:
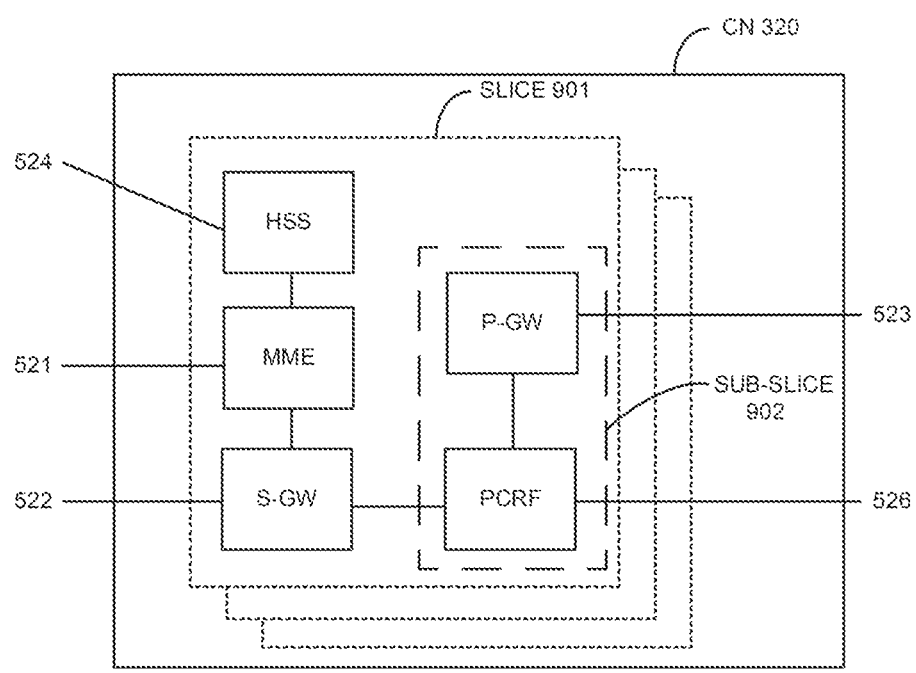
FIG. 9 illustrates components of a core network in accordance with some embodiments of the present disclosure.

FIG. 9 illustrates components of a core network in accordance with some embodiments. The components of the CN 320 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 320 may be referred to as a network slice 901. A logical instantiation of a portion of the CN 320 may be referred to as a network sub-slice 902 (e.g., the network sub-slice 902 is shown to include the PGW 323 and the PCRF 326).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
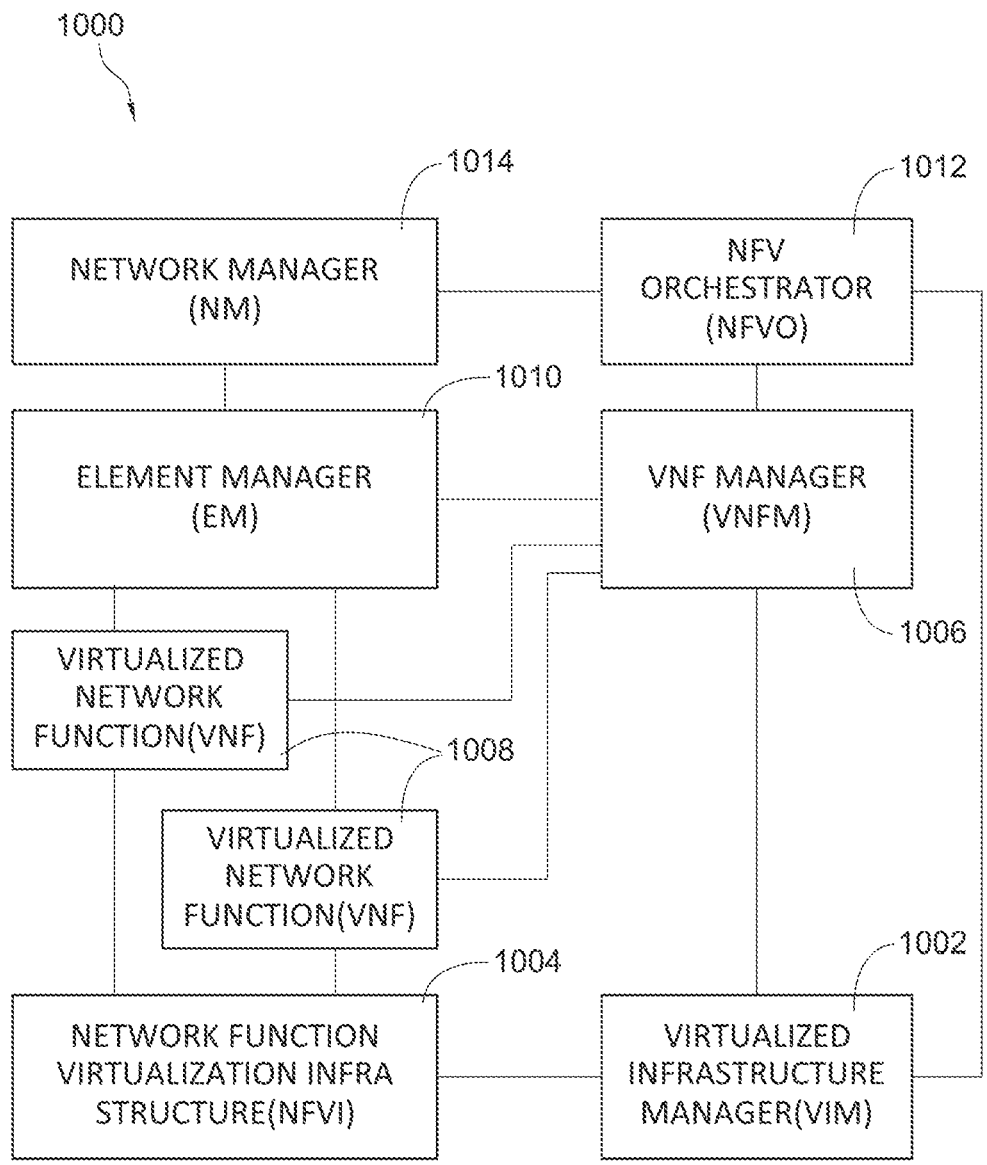
FIG. 10 is a block diagram illustrating components in accordance with some embodiments of the present disclosure.

FIG. 10 is a block diagram illustrating components, according to some example embodiments, of a system 1000 to support NFV. The system 1000 is illustrated as including a virtualized infrastructure manager (VIM) 1002, a network function virtualization infrastructure (NFVI) 1004, a VNF manager (VNFM) 1006, virtualized network functions (VNFs) 1008, an element manager (EM) 1010, an NFV Orchestrator (NFVO) 1012, and a network manager (NM) 1014.

The VIM 1002 manages the resources of the NFVI 1004. The NFVI 1004 can include physical or virtual resources and applications (including hypervisors) used to execute the system 1000. The VIM 1002 may manage the life cycle of virtual resources with the NFVI 1004 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1006 may manage the VNFs 1008. The VNFs 1008 may be used to execute EPC components/functions. The VNFM 1006 may manage the life cycle of the VNFs 1008 and track performance, fault and security of the virtual aspects of VNFs 1008. The EM 1010 may track the performance, fault and security of the functional aspects of VNFs 1008. The tracking data from the VNFM 1006 and the EM 1010 may comprise, for example, performance measurement (PM) data used by the VIM 1002 or the NFVI 1004. Both the VNFM 1006 and the EM 1010 can scale up/down the quantity of VNFs of the system 1000.

The NFVO 1012 may coordinate, authorize, release and engage resources of the NFVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur via the EM 1010).

Figure 11:
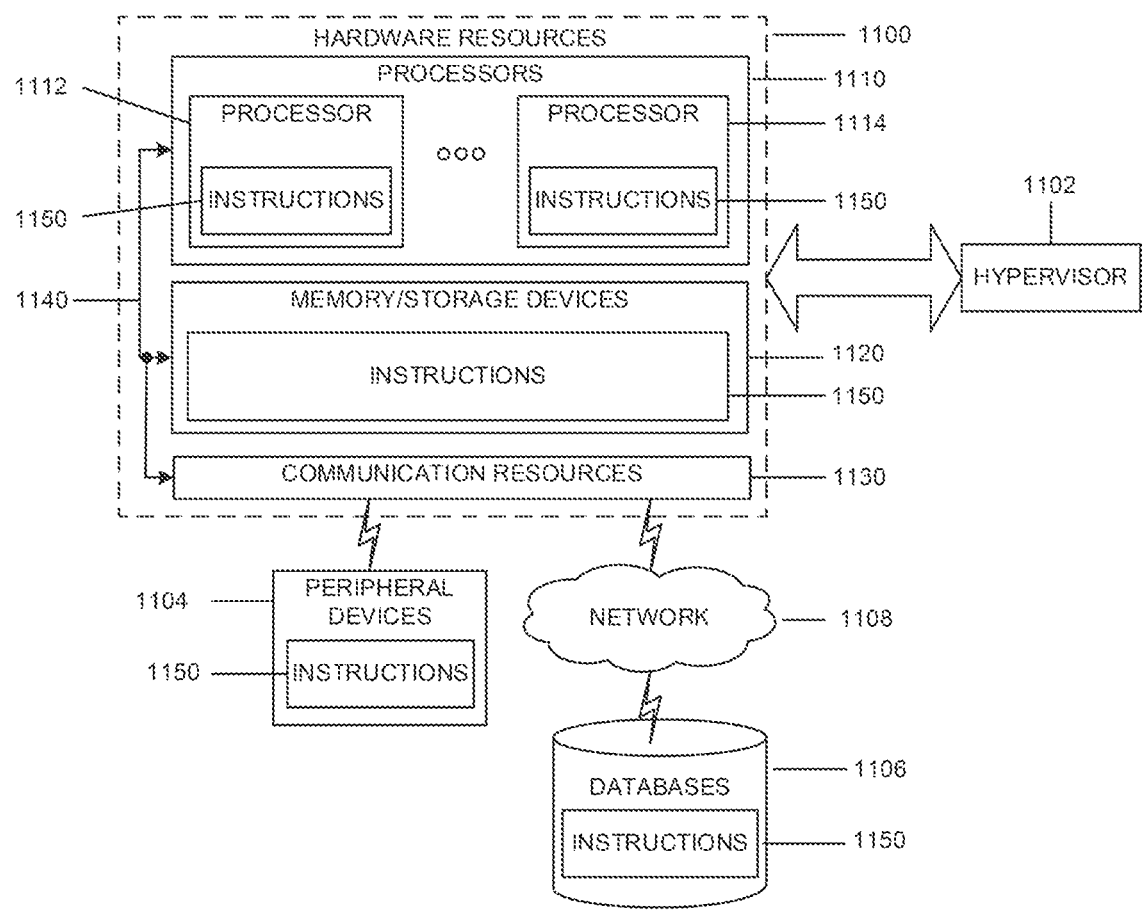
FIG. 11 is a block diagram illustrating components in accordance with some embodiments of the present disclosure.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable medium.

In some embodiments, the electronic device(s), network(s), system(s), chip(s) or component(s), or portions or implementations thereof, of any figure herein may be configured to perform one or more processes, techniques, or methods as described herein, or portions thereof.

EXAMPLES

Example 1 may include an apparatus configured to be employed in a user equipment (UE), comprising: a radio frequency (RF) circuitry interface; and processing circuitry, configured to: calculate a power headroom (PHR) of a grantless uplink (GUL) physical uplink shared channel (PUSCH) according to the formula: $PH_{type1,c}(i)=P_{CMAX,c}(i)-\{10 \log_{10}(M_{PUSCH\_GUL,c}(i))+P_{O\_PUSCH,c}(j)+\alpha_c(j) \cdot PL_c+\Delta_{TF,c}(i)+f_{GUL,c}(i)\}$ wherein $M_{PUSCH\_GUL,c}$ is a configured GUL resource; $P_{O\_PUSCH,c}$ reuse a scheduled uplink (SUL); $f_{GUL,c}$ is a dynamic power adjustment; and generate an uplink data including the PHR of GUL.

Example 2 may include the subject matter of Example 1, wherein the uplink data including the PHR of GUL is included in either the SUL or the GUL PUSCH subframe.

Example 3 may include the subject matter of Example 1 or 2, wherein the processing circuitry is further configured to calculate a PHR of SUL and generate an uplink data including the PHR of SUL.

Example 4 may include the subject matter of any one of Examples 1 to 3, wherein the the uplink data including PHR of SUL is included only in the SUL PUSCH subframe or in both the SUL and the GUL PUSCH subframe.

Example 5 may include the subject matter of any one of Examples 1 to 4, wherein the processing circuitry is configured to send the uplink data including the PHR of GUL and the uplink data including the PHR of SUL to an eNB.

Example 6 may include the subject matter of any one of Examples 1 to 5, wherein the PHR of GUL is a type 1 PHR or a type 2 PHR.

Example 7 may include the subject matter of any one of Examples 1 to 6, wherein the PHR of SUL is a type 1 PHR, a type 2 PHR or a type 3 PHR.

Example 8 may include the subject matter of any one of Examples 1 to 7, wherein the processing circuitry is further configured to provide a prohibitPHR-Timer; and trigger the PHR of GUL when the prohibitPHR-Timer expires or has expired.

Example 9 may include the subject matter of any one of Examples 1 to 8, wherein the processing circuitry is further configured to provide a periodicPHR-Timer; and trigger the PHR of GUL when the periodicPHR-Timer expires.

Example 10 may include the subject matter of any one of Examples 1 to 9, wherein a Medium Access Control (MAC) Control Element (CE) index is introduced for the PHR of GUL reporting when the PHR of SUL is transmitted in the SUL.

Example 11 may include a computer-readable medium comprising instructions that, when executed, cause an electronic device to: calculate a power headroom (PHR) of a grantless uplink (GUL) physical uplink shared channel (PUSCH); and generate an uplink data including the PHR of GUL.

Example 12 may include the subject matter of Example 11, wherein the instructions, when executed, cause the electronic device to calculate the PHR of the GUL PUSCH according to the formula: $PH_{type1,c}(i)=P_{CMAX,c}(i)-\{10 \log_{10}(M_{PUSCH\_GUL,c}(i))+P_{O\_PUSCH,c}(j)+\alpha_c(j) \cdot PL_c+\Delta_{TE,c}(i)+f_{GUL,c}(i)\}$, wherein $M_{PUSCH\_GUL,c}$ is a configured GUL resource; $P_{O\_PUSCH,c}$ reuse a scheduled uplink (SUL); $f_{GUL,c}$ is a dynamic power adjustment.

Example 13 may include the subject matter of Example 11 or 12, wherein the uplink data including the PHR of GUL is included in either the SUL or the GUL PUSCH subframe.

Example 14 may include the subject matter of any one of Examples 11 to 13, wherein the instructions, when executed, further cause the electronic device to calculate a PHR of SUL and generate an uplink data including the PHR of SUL.

Example 15 may include the subject matter of Example 11 or 14, wherein the uplink data including the PHR of SUL is included only in the SUL PUSCH subframe or in both the SUL and the GUL PUSCH subframe.

Example 16 may include the subject matter of any one of Examples 11 to 15, wherein the instructions, when executed, cause the electronic device to send the uplink data including the PHR of GUL to an eNB.

Example 17 may include the subject matter of any one of Examples 11 to 16, wherein the instructions, when executed, cause the electronic device to send the uplink data including the PHR of SUL to an eNB.

Example 18 may include the subject matter of any one of Examples 11 to 17, wherein the PHR of GUL is a type 1 PHR or a type 2 PHR.

Example 19 may include the subject matter of any one of Examples 11 to 18, wherein the PHR of SUL is a type 1 PHR, a type 2 PHR or a type 3 PHR.

Example 20 may include the subject matter of any one of Examples 11 to 19, wherein the instructions, when executed, cause the electronic device to provide a prohibitPHR-Timer; and trigger the PHR of GUL when the prohibitPHR-Timer expires or has expired.

Example 21 may include the subject matter of any one of Examples 11 to 20, wherein the instructions, when executed, cause the electronic device to provide a periodicPHR-Timer; and trigger the PHR of GUL when the periodicPHR-Timer expires.

Example 22 may include the subject matter of any one of Examples 11 to 21, wherein a Medium Access Control (MAC) Control Element (CE) index is introduced for the PHR of GUL reporting when the PHR of SUL is transmitted in the SUL.

Example 23 may include a method comprising calculate a power headroom (PHR) of a grantless uplink (GUL) physical uplink shared channel (PUSCH); and generate an uplink data including the PHR of GUL.

Example 24 may include a method comprising: calculating, triggering and reporting of power headroom for grantless PUSCH.

Example 25 may include the method of example 24 or some other example herein, wherein the PHR of GUL can be either reported or not reported. If it's reported, it can be transmitted through either SUL or GUL PUSCH subframe.

Example 26 may include the method of example 24 or some other example herein, wherein the PHR of SUL can be transmitted only on SUL PUSCH subframe, or transmitted on both SUL and GUL PUSCH subframes.

Example 27 may include the method of example 24 or some other example herein, wherein the PHR of GUL PUSCH is calculated as: $PH_{type1,c}(i)=P_{CMAX,c}(i)-\{10 \log_{10}(M_{PUSCH\_GUL,c}(i))+P_{O\_PUSCH,c}(j)+\alpha_c(j) \cdot PL_c+\Delta_{TE,c}(i)+f_{GUL,c}(i)\}$, where $M_{PUSCH\_GUL,c}$ is the configured GUL resource. It's configured by eNB through activation/release DCI; $P_{O\_PUSCH,c}$ reuse the SUL; $f_{GUL,c}$ is the dynamic power adjustment, which are configured by eNB through GUL activation/release DCI, or grantless DCI.

Example 28 may include the method of example 24 or some other example herein, wherein since there is no PUCCH and SRS transmitted together with grantless PUSCH, (1) The type 3 PHR is not supported for GUL; (2) For type 1 and 2 PHR, the PHR of PUSCH transmission without PUCCH is supported for GUL PUSCH.

Example 29 may include the method of example 24 or some other example herein, wherein the PHR of GUL reuse the trigger condition as the legacy PHR of SUL. The GUL can reuse the same value of "prohibitPHR-Timer" and "periodicPHR-Timer", but utilize a separate account, since the PHR reporting time of SUL and GUL may be different.

Example 30 may include the method of example 24 or some other example herein, wherein if the PHR of SUL can be transmitted in the GUL PUSCH, a new MAC CE index can be introduced for GUL PHR reporting.

Example 31 may include the method of example 24 or some other example herein, wherein the SUL is only allowed to be transmitted in the SUL, then GUL PHR can reuse the MAC CE index of SUL PHR. The eNB can distinguish them by detecting whether this subframe is SUL or GUL.

Example 32 may include the method of example 24 or some other example herein, wherein only one or multiple MAC CE, e.g., (GUL PHR) can be transmitted on GUL, alternatively, one or multiple MAC CE is allowed to be transmitted when there are multiplexing data, wherein: (1) only one or multiple MAC CEs can be transmitted with single interlace configuration; and/or (2) only there is multiplexing data, MAC CE is allowed to be transmitted on GUL when GUL is configured with full bandwidth configuration.

Example 33 may include an apparatus comprising means to perform one or more elements of a method described in or related to any of examples 24-32, or any other method or process described herein.

Example 34 may include one or more non-transitory computer-readable medium comprising instructions to cause an electronic device, upon execution of the instructions by one or more processors of the electronic device, to perform one or more elements of a method described in or related to any of examples 24-33, or any other method or process described herein.

Example 35 may include an apparatus comprising logic, modules, or circuitry to perform one or more elements of a method described in or related to any of examples 24-33, or any other method or process described herein.

Example 36 may include a method, technique, or process as described in or related to any of examples 24-33, or portions or parts thereof.

Example 37 may include an apparatus comprising: one or more processors and one or more computer readable medium comprising instructions that, when executed by the one or more processors, cause the one or more processors to perform the method, techniques, or process as described in or related to any of examples 24-33, or portions thereof.

Example 38 may include a signal as described in or related to any of examples 24-33, or portions or parts thereof.

Example 39 may include a signal in a wireless network as shown and described herein.

Example 40 may include a method of communicating in a wireless network as shown and described herein.

Example 41 may include a system for providing wireless communication as shown and described herein.

Example 42 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus configured to be employed in a User Equipment (UE), comprising:
a Radio Frequency (RF) circuitry interface; and
processing circuitry, coupled with the RF circuitry interface, configured to:
calculate a Power Headroom (PHR) of a Grantless Uplink (GUL) Physical Uplink Shared Channel (PUSCH) according to:

$$PH_{type1,c}(i)=P_{CMAX,c}(i)-\{10 \log_{10}(M_{PUSCH\_GUL,c}(i))+P_{O\_PUSCH,c}(j)+\alpha_c(j) \cdot PL_c+\Delta_{TF,c}(i)+f_{GUL,c}(i)\}$$

wherein $M_{PUSCH\_GUL,c}$ is a configured GUL resource; $P_{O\_PUSCH,c}$ reuses a Scheduled Uplink (SUL); and $f_{GUL,c}$ is a dynamic power adjustment; and
generate an uplink data including the PHR of the GUL PUSCH.

2. The apparatus of claim 1, wherein the uplink data including the PHR of the GUL PUSCH is included in either the SUL or a GUL PUSCH subframe.

3. The apparatus of claim 1, wherein the processing circuitry is further configured to calculate a PHR of the SUL and generate an uplink data including the PHR of the SUL.

4. The apparatus of claim 3, wherein the uplink data including the PHR of the SUL is included only in a SUL PUSCH subframe or in both the SUL and a GUL PUSCH subframe.

5. The apparatus of claim 4, wherein the processing circuitry is configured to send the uplink data including the PHR of the GUL PUSCH subframe and the uplink data including the PHR of the SUL to an eNB.

6. The apparatus of claim 1, wherein the PHR of the GUL PUSCH is a type 1 PHR or a type 2 PHR.

7. The apparatus of claim 1, wherein the processing circuitry is further configured to provide a prohibitPHR-Timer; and trigger the PHR of the GUL PUSCH when the prohibitPHR-Timer expires or has expired.

8. The apparatus of claim 1, wherein the processing circuitry is further configured to provide a periodicPHR-Timer; and trigger the PHR of the GUL PUSCH when the periodicPHR-Timer expires.

9. The apparatus of claim 1, wherein a Medium Access Control (MAC) Control Element (CE) index is introduced for reporting the PHR of the GUL PUSCH when a PHR of the SUL is transmitted in the SUL.

10. One or more non-transitory, computer-readable media comprising instructions that, when executed, cause an electronic device to:
calculate a Power Headroom (PHR) of a Grantless Uplink (GUL) Physical Uplink Shared Channel (PUSCH); and
generate an uplink data including the PHR of the GUL PUSCH.

11. The one or more non-transitory, computer-readable media of claim 10, wherein the instructions, when executed, cause the electronic device to calculate the PHR of the GUL PUSCH according to:

$$PH_{type1,c}(i)=P_{CMAX,c}(i)-\{10 \log_{10}(M_{PUSCH\_GUL,c}(i))+P_{O\_PUSCH,c}(j)+\alpha_c(j) \cdot PL_c+\Delta_{TF,c}(i)+f_{GUL,c}(i)\}$$

wherein $M_{PUSCH\_GUL,c}$ is a configured GUL resource; $P_{O\_PUSCH,c}$ reuses a scheduled uplink (SUL); and $f_{GUL,c}$ is a dynamic power adjustment.

12. The one or more non-transitory, computer-readable media of claim 11, wherein the uplink data including the PHR of the GUL PUSCH is included in either the SUL or a GUL PUSCH subframe.

13. The one or more non-transitory, computer-readable media of claim 10, wherein the instructions, when executed, cause the electronic device to calculate a PHR of a scheduled uplink (SUL) and generate an uplink data including the PHR of the SUL.

14. The one or more non-transitory, computer-readable media of claim 13, wherein the uplink data including the PHR of the SUL is included only in a SUL PUSCH subframe or in both the SUL and a GUL PUSCH subframe.

15. The one or more non-transitory, computer-readable media of claim 14, wherein the instructions, when executed, cause the electronic device to send the uplink data including the PHR of the GUL PUSCH and the uplink data including the PHR of the SUL PUSCH subframe to an eNB.

16. The one or more non-transitory, computer-readable media of claim 11, wherein the PHR of the GUL PUSCH is a type 1 PHR or a type 2 PHR.

17. The one or more non-transitory, computer-readable media of claim 11, wherein the instructions, when executed, cause the electronic device to provide a prohibitPHR-Timer; and trigger the PHR of the GUL PUSCH when the prohibitPHR-Timer expires or has expired.

18. The one or more non-transitory, computer-readable media of claim 11, wherein the instructions, when executed, cause the electronic device to provide a periodicPHR-Timer; and trigger the PHR of the GUL PUSCH when the periodicPHR-Timer expires.

19. The one or more non-transitory, computer-readable media of claim 11, wherein a Medium Access Control (MAC) Control Element (CE) index is introduced for reporting the PHR of the GUL PUSCH when the PHR of the SUL is transmitted in the SUL.

* * * * *